(12) United States Patent
Cho (10) Patent No.: US 8,414,345 B2
(45) Date of Patent: Apr. 9, 2013

(54) 3-DIMENSIONAL DISPLAY AND METHOD OF MANUFACTURE

(75) Inventor: Byoung gu Cho, Seoul (KR)

(73) Assignee: Lightizer Korea Co., Seoul (KR)

( * ) Notice: Subject to any disclaimer, the term of this patent is extended or adjusted under 35 U.S.C. 154(b) by 26 days.

(21) Appl. No.: 12/838,579

(22) Filed: Jul. 19, 2010

(65) Prior Publication Data

US 2012/0015579 A1  Jan. 19, 2012

(51) Int. Cl.
*H01J 9/00* (2006.01)
*H01L 21/00* (2006.01)

(52) U.S. Cl. .............. 445/24; 438/26; 438/29; 438/110; 438/116; 438/127

(58) Field of Classification Search .............. 445/23–25; 438/26, 29, 110, 116, 127
See application file for complete search history.

(56) References Cited

U.S. PATENT DOCUMENTS

| | | | |
|---|---|---|---|
| 5,717,453 A | 2/1998 | Wohlstadter | |
| 6,014,259 A | 1/2000 | Wohlstadter | |
| 6,344,837 B1 | 2/2002 | Gelsey | |
| 6,392,690 B1 | 5/2002 | Fujii et al. | |
| 6,437,920 B1 | 8/2002 | Wohlstadter | |
| 6,721,023 B1 | 4/2004 | Weiss et al. | |
| 6,736,512 B2 | 5/2004 | Balogh | |
| 6,909,552 B2 | 6/2005 | Dohi et al. | |
| 6,909,555 B2 | 6/2005 | Wohlstadter | |
| 7,167,313 B2 | 1/2007 | Wohlstadter | |
| 7,190,328 B1 | 3/2007 | Clar | |
| 7,342,721 B2 | 3/2008 | Lukyanitsa | |
| 7,446,733 B1 | 11/2008 | Hirimai | |
| 7,537,345 B2 | 5/2009 | Refai et al. | |
| 2004/0212550 A1 | 10/2004 | He | |
| 2004/0227992 A1* | 11/2004 | Putilin et al. | 359/462 |
| 2006/0273983 A1* | 12/2006 | Koo et al. | 345/6 |
| 2007/0009222 A1* | 1/2007 | Koo et al. | 385/147 |
| 2007/0035830 A1* | 2/2007 | Matveev et al. | 359/464 |
| 2007/0201133 A1 | 8/2007 | Cossairt | |
| 2007/0242028 A1* | 10/2007 | Kitagawa et al. | 345/100 |
| 2008/0062349 A1* | 3/2008 | Komori | 349/60 |
| 2010/0060553 A1 | 3/2010 | Zimmerman et al. | |

OTHER PUBLICATIONS

Non-final Office Action dated Feb. 3, 2011, for U.S. Appl. No. 12/750,816 filed Mar. 31, 2010.

* cited by examiner

*Primary Examiner* — Joseph L Williams
(74) *Attorney, Agent, or Firm* — Ronald A. D'Alessandro; Keohane & D'Alessandro PLLC (57) ABSTRACT

In general, embodiments of the present invention provide a 3-dimensional (3-D) display and method of manufacture. Specifically, under the embodiments of the present invention, a plurality of active lighting panels is stacked in successive fashion within a display. The plurality of active light panels typically comprises pixel-based active lighting panels, Liquid Crystal Display (LCD)-based active lighting panels, Light Emitting Diode (LED)-based active lighting panels, Organic Light Emitting Diode (OLED)-based active lighting panels, or a combination thereof. Using the stack of active lighting panels, a 3-D view is generated. This 3-D view is viewable to the naked eye of a viewer (e.g., without the use of 3-D glasses or any other type of assistive optics). Typically, the view is generated and controlled using active light device control circuitry, which is configured to control the output of the active lighting panels both individually and with respect to one another.

15 Claims, 7 Drawing Sheets

3-DIMENSIONAL DISPLAY AND METHOD OF MANUFACTURE

CROSS-REFERENCE TO RELATED INVENTION

The present invention is related in some aspects to commonly-owned and co-pending application Ser. No. 12/496,776, filed Jul. 2, 2009, and entitled HYBRID MULTI-FUNCTION COMPONENT SYSTEM, the entire contents of which are herein incorporated by reference. The present invention is also related in some aspects to commonly-owned and co-pending application Ser. No. 12/750,823, filed Mar. 31, 2010, and entitled MULTICHIP LIGHT EMITTING DIODE (LED) AND METHOD OF MANUFACTURE, the entire contents of which are herein incorporated by reference. The present invention is also related in some aspects to commonly-owned and co-pending application Ser. No. 12/750,816, filed Mar. 31, 2010, and entitled LIGHT EMITTING DIODE HAVING A WAVELENGTH SHIFT LAYER AND METHOD OF MANUFACTURE, the entire contents of which are herein incorporated by reference.

TECHNICAL FIELD

In general, the present invention relates to a 3-dimensional display and method of manufacture. Specifically, the present invention relates to a 3-dimensional (herein 3-D) display created by arranging a set of active lighting panels within a display unit.

BACKGROUND OF THE INVENTION

With the development of technology, a display apparatus can now process and display various types of a video signal regardless of whether it is digital or analog. Further, watching a stereoscopic image based on a 3-D video signal (hereinafter, referred to as a "stereoscopic video signal") through a monitor, a television or other display apparatus, has recently become possible. In general, the stereoscopic video signal has contents divided corresponding to left and right eyes of a user as opposed to a 2-dimensional video signal (hereinafter, referred to as a "plane" video signal). Also, the contents are displayed as divided images corresponding to the left and right eyes of a user, respectively. At this time, to enable a user to experience the stereoscopic image based on the images being divided to the left and right eyes, a polarized-glass method and a shutter-glass method are employed. The polarized-glass method uses a phase-difference filter, and the shutter-glass method displays left and right images alternately by switching a shutter on and off. However, these related art methods do not provide an image of optimal quality and unnecessarily consume power in processing a stereoscopic video signal.

Previous attempts have been made at creating 3-D displays. Two such examples are U.S. Pat. No. 7,342,721 to Lukyanitsa and U.S. Pat. No. 7,190,328 to Clar. However, both references fail to teach or suggest the various features of the present invention as described below.

SUMMARY OF THE INVENTION

In general, embodiments of the present invention provide a 3-D (3-D) display and method of manufacture. Specifically, under the embodiments of the present invention, a plurality of active lighting panels are stacked in successive fashion within a display. The plurality of active light panels typically comprise pixel-based active lighting panels, Liquid Crystal Display (LCD)-based active lighting panels, Light Emitting Diode (LED)-based active lighting panels, Organic Light Emitting Diode (OLED)-based active lighting panels, or a combination thereof. Using the stack of active lighting panels, a 3-D view is generated. This 3-D view is viewable to the naked eye of a viewer (e.g., without the use of 3-D glasses or any other type of assistive optics). Typically, the view is generated and controlled using active light device control circuitry, which is configured to control the output of the active lighting panels both individually and with respect to one another.

A first aspect of the present invention provides a method of manufacturing a 3-D display, comprising: arranging a plurality of active lighting panels within a display; generating a 3-D view using the plurality of active lighting panels and active light control circuitry, the active light control circuitry controlling light emitted from the plurality of active lighting panels to generate the 3-D display.

A second aspect of the present invention provides a method of manufacturing a 3-D display, comprising: stacking a plurality of active lighting panels in successive fashion within a display, the plurality of active light panels being selected from a group consisting of pixel-based active lighting panels, LCD-based active lighting panels, LED-based active lighting panels, OLED-based active lighting panels, or a combination thereof; and generating a 3-D view using the plurality of active lighting panels and active light control circuitry, the active light control circuitry being configured to control an intensity of light emitted from the plurality of active lighting panels.

A third aspect of the present invention provides a 3-D display, comprising: a plurality of active lighting panels stacked in successive fashion within a display, the plurality of active light panels being selected from a group consisting of pixel-based active lighting panels, LCD-based active lighting panels, LED-based active lighting panels, OLED-based active lighting panels, or a combination thereof; active light control circuitry being configured to control an intensity of light emitted from the plurality of active lighting panels; and a 3-D view generated using the plurality of active lighting panels and the active light control circuitry.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Illustrative LED Embodiment I. General Description As indicated above, embodiments of the present invention provide a 3-D display and method of manufacture. Specifically, under the embodiments of the present invention, a plurality of active lighting panels are stacked in successive fashion within a display. The plurality of active light panels typically comprise pixel-based active lighting panels, Liquid Crystal Display (LCD)-based active lighting panels, Light Emitting Diode (LED)-based active lighting panels, Organic Light Emitting Diode (OLED)-based active lighting panels, or a combination thereof. Using the stack of active lighting panels, a 3-D view is generated. This 3-D view is viewable to the naked eye of a viewer (e.g., without the use of 3-D glasses or any other type of assistive optics). Typically, the view is generated and controlled using active light device control circuitry, which is configured to control the output of the active lighting panels both individually and with respect to one another.

Figure 1:
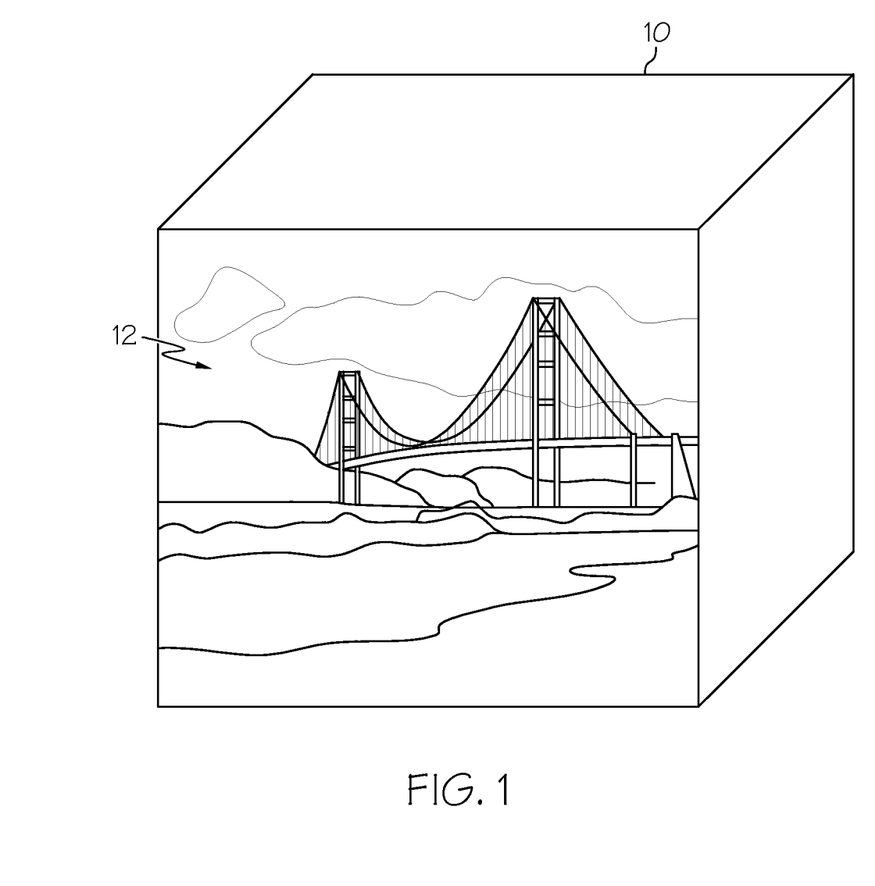
FIG. 1 depicts a 3-D display according to an embodiment of the present invention.
Figure 2:
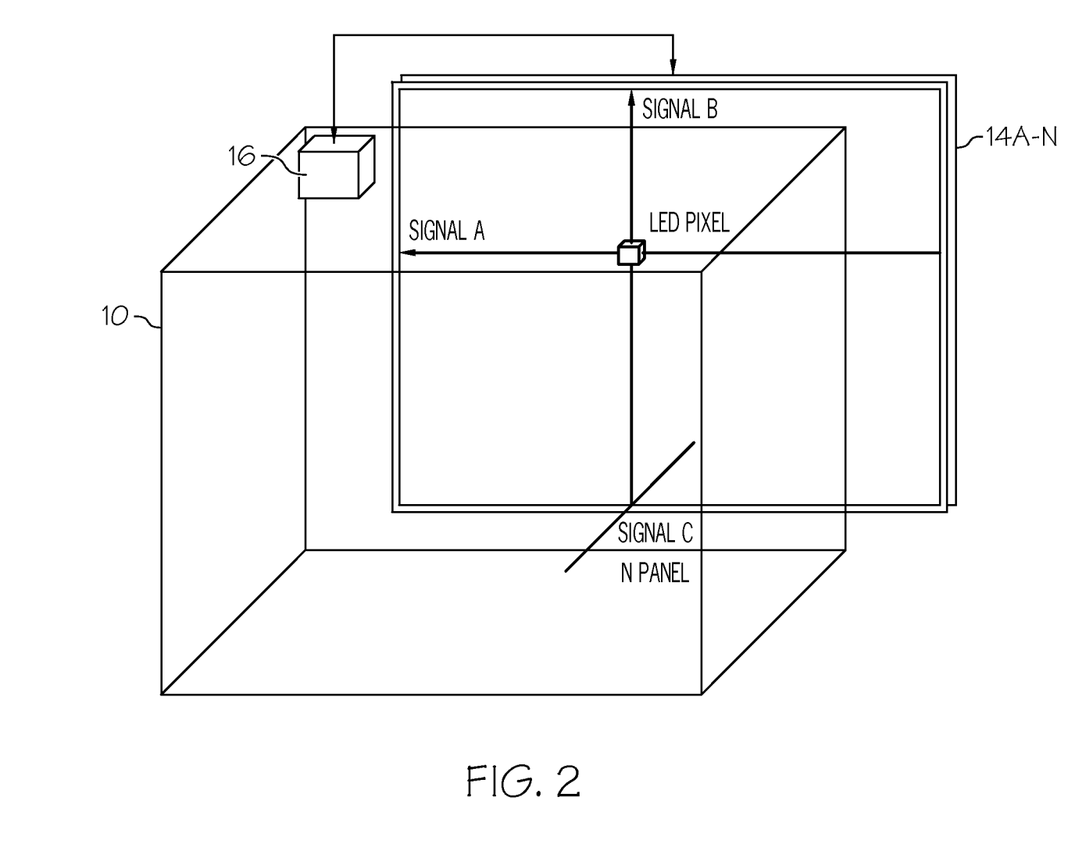
FIG. 2 depicts the stacking of active lighting panels within the display of FIG. 1 according to an embodiment of the present invention.

Referring now to FIG. 1 a display 10 having a 3-D view 12 is depicted. Under embodiments of the present invention, the 3-D view will be displayable to the naked eye of a viewer, without the need for 3-D glasses or other assistive optic(s). Referring to FIG. 2, the technology that enables such functionality will be described in greater detail. Specifically, FIG. 2 shows a plurality of active lighting panels (hereinafter "panels 14A-N") stacked in successive fashion within display 10. Although FIG. 2 shows pixel-based active lighting panels, it is understood that panels 14A-N can be pixel-based active lighting panels, LCD-based active lighting panels, LED-based active lighting panels, OLED-based active lighting panels, or any combination thereof.

The function and output of panels 14A-N is typically controlled by active light control circuitry (hereinafter "circuitry 16"). Specifically, among other things, circuitry 16 is coupled to one or more of panels 14A-N and is configured to control the operation (e.g., illumination) thereof both individually and with respect to one another. Along these lines, circuitry 16 can be similar to that used in existing single panel TVs, only modified (e.g., with additional components) or reconfigured to be able to control and manage the operation of a plurality of panels such as panels 14A-N. As can be seen, panels 14A-N are stacked so that three axis A, B, and C of signal and associated view (AX, Y, and Z respectively), are provided. Using panels 14A-N and circuitry 16 in this manner, a 3-D view is generated.

Figure 3:
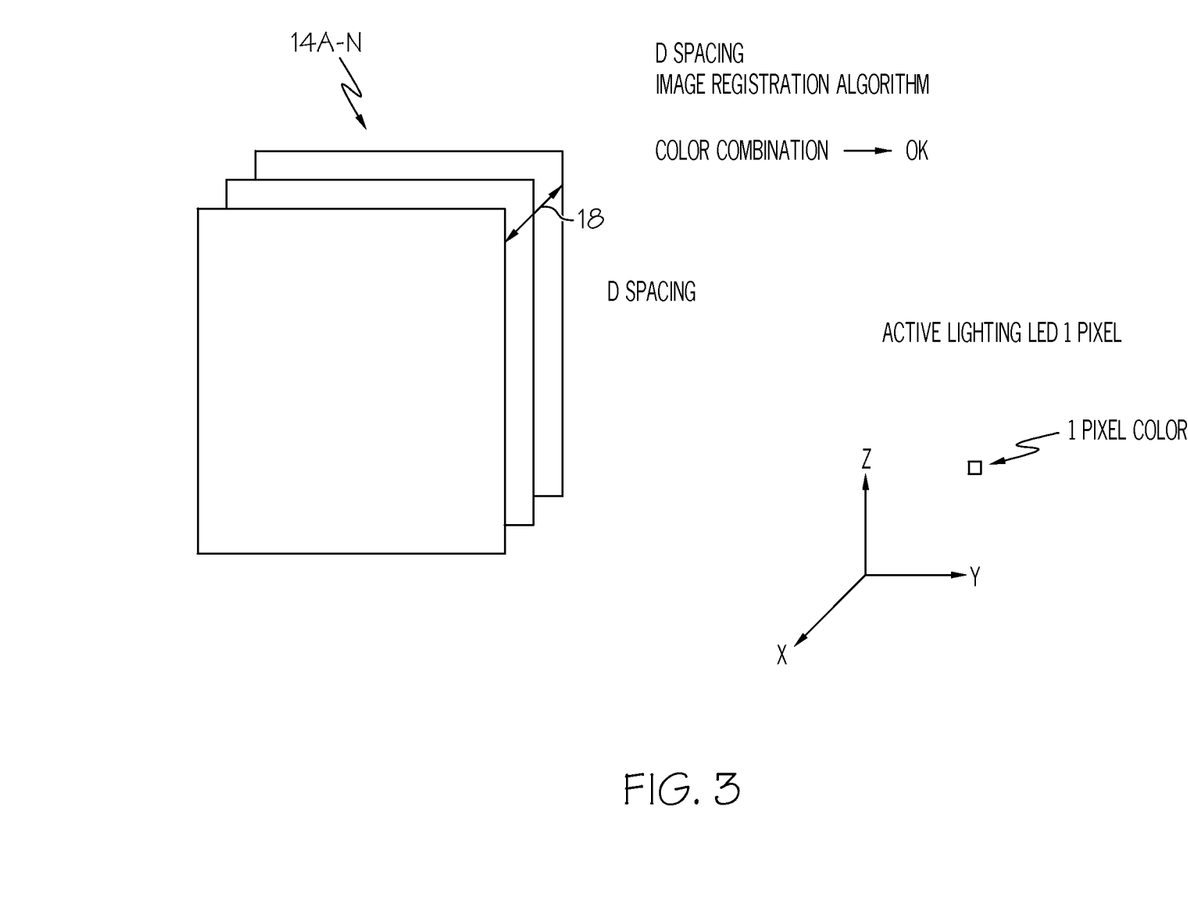
FIG. 3 depicts the spacing and positioning of the active lighting panels according to an embodiment of the present invention.

Referring to FIG. 3, the stacking of panels 14A-N is shown in greater detail. As depicted, panels 14A-N are stacked having a predetermined/fixed distance (D) 18 therebetween. In addition, to provide the 3-D view 12 (FIG. 1), circuitry 16 (FIG. 2) implement and process an image registration algorithm and regulate various color combinations so that the 3-D view is provided with quality (e.g., without intra and/or inter-panel color combinations obscuring one another).

In general, panels 14A-N will create a plurality of images (e.g., at different positions and/or angles) that can be utilized (e.g., combed) to create 3-D view 12 (FIG. 1). Along these lines, circuitry 16 can control various visual/video features of panels 16A-N. For example, circuitry 16 can control an intensity of the light emitted from panels 16A-N. In addition, circuitry could control the rate and/or timing patterns of the lights on panels 16A-N. Such control can occur to panels 16A-N collectively and/or individually. Among other things, previous attempts such as U.S. Pat. No. 7,342,721 to Lukyanitsa and U.S. Pat. No. 7,190,328 to Clar fail to teach the ability to use stacked active lighting panels 14A-N to create pixel-based, LCD-based LED-based, OLED-based displays. Moreover, none of the previous attempts have provided circuitry that performs all of the functions in creating a 3-D display that circuitry 16 of the present invention does.

II. Illustrative LED Embodiment

Regardless, as indicated above, one embodiment of the present invention could be implemented using LED-based active lighting panels. Along these lines, the teachings of FIGS. 4-7 could be implemented in creating the LED-based active lighting panels. Among these teachings is the ability to create a white light LED. Referring now to FIGS. 4-7, the creation of white light from LED chips will be described. Specifically, in order to implement the target white color output coordinate in which it is identical about all chips 30 in wafer 32, a proper fluorescent substance combination ratio, in which it has to be coated in each unit chip by using the result of measuring the wavelength of all chips 30, is determined. For example, the combination ratio of A in case of the wavelength $\alpha$, the combination ratio of B in case of the wavelength $\beta$, and the combination ratio of C in case of the wavelength $\gamma$ is applied. Dispensers 34A-C correspond to the multiple combination ratio and three coating materials are prepared. Each dispenser 34A-C is filled with the fluorescent substance of the respectively different combination ratio A, B, or C.

Figure 4A:
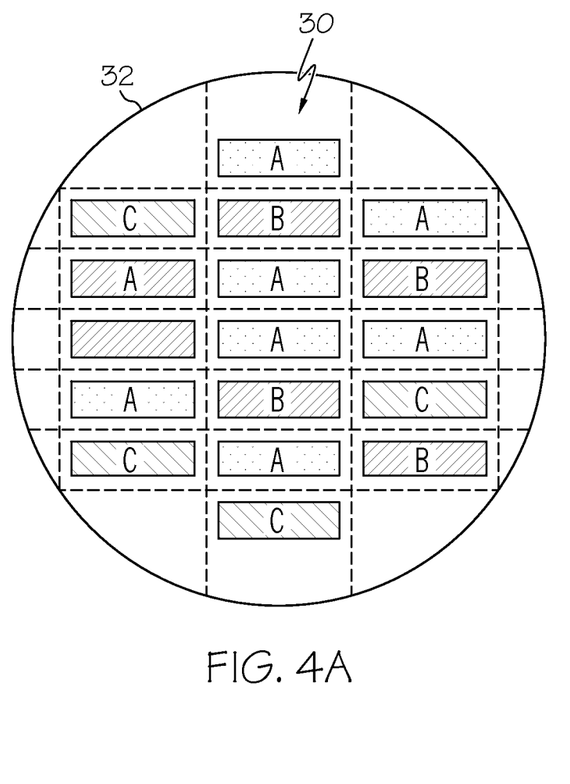
FIG. 4 depicts a graphic representation of a chip level conformal coating (CLCC) mode in the wafer level according to an embodiment of the present invention.
Figure 4B:
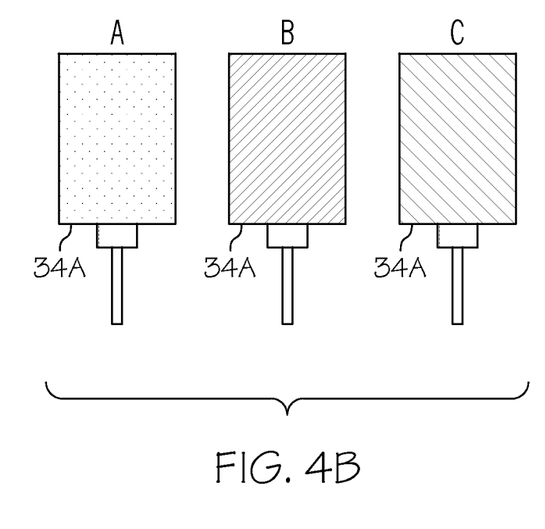

As seen in FIG. 4, dispenser 34A-C makes the coated film (fluorescent substance plus silicon material) in which it corresponds to each unit chip while at the wafer level by the dispensing method. Therefore, it is comprised of the fluorescent substance conformal coating in the adhesion layer that was previously applied to the top surface of each LED chip. In this way, the white LED chip is ultimately implemented in the wafer level through the fluorescent substance coating. Under the present invention, three examples in which it independently coats the fluorescent substance plus silicon material in the wafer level according to each unit chip 30 are proposed.

Figure 5A:
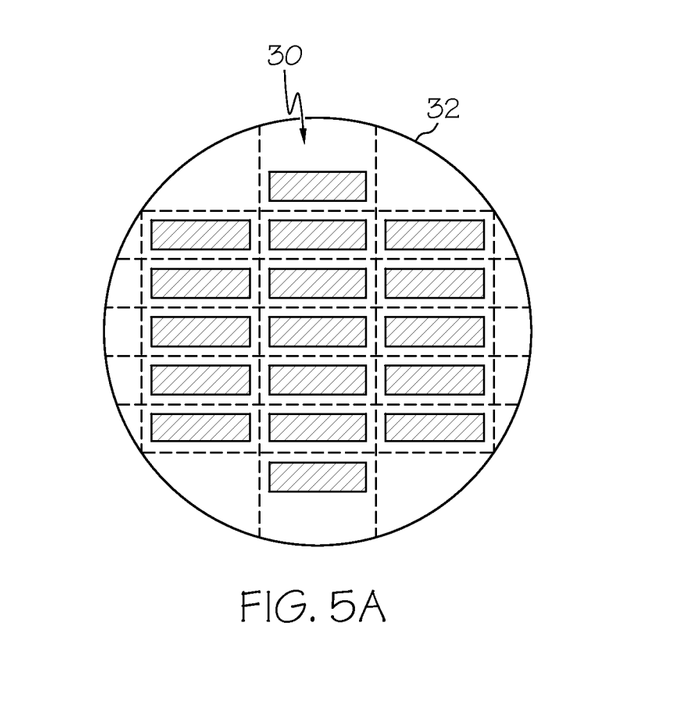
FIG. 5 depicts a method of providing the guide dam in a scribe line and metal pad part in the wafer level through a paraffin print and coating the fluorescent substance plus silicon according to each chip with dispensing in a CLCC implementation according to an embodiment of the present invention.
Figure 5B:
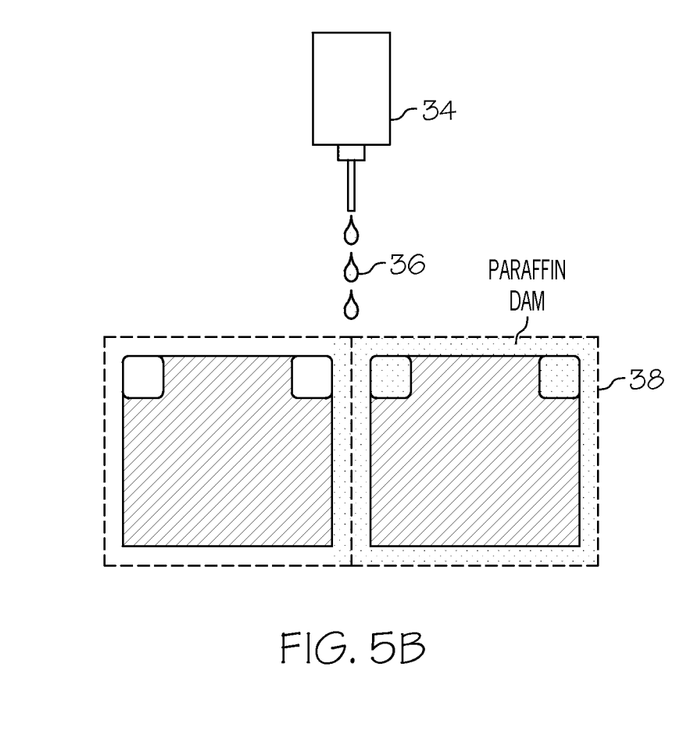

The first example is shown in FIG. 5. In this case, the scribe line between chips 30 within wafer 32 prints a material that includes paraffin 36 (possibly along with others). This prevents the fluorescent substance material from being coated in the scribe line. Next, the metal pad part prints a material including paraffin 36, etc., along the pad line. As to this, the fluorescent substance plus silicon material does not penetrate into the pad part in the dispensing process. Now, the thickness of the coating film becomes about 100 um in the case of a material including paraffin by printing method. A major function of the paraffin material is as a guide dam 38. As to the guide dam 36, the fluorescent substance plus silicon material prevents a coating. Accordingly, in the wafer level, the coating is possible at each chip corresponding to the fluorescent substance plus silicon material of the different combination ratios for the target white light output. The configuration of this embodiment is as follows:

(1) Measure the wavelength of each diode chip in the wafer level;

(2) Determine the combination ratio of the proper fluorescent substance (yellow, red, green) for making the white target color output coordinate with the measured blue wavelength general classification and silicon;

(3) Form the guide dam in the scribe line between all chips and the outside of the pad within the LED chip wafer as shown in FIG. 5 using a material including paraffin by being made with the line printing (or dispensing);

(4) Coat the fluorescent substance in which it has the combination ratio appropriate for each chip wavelength within the wafer it implements, the white target color output coordinate, and the silicon material for the adhesive force with dispensing; and (5) Hard cure the fluorescent substance plus silicon material.

Figure 6A:
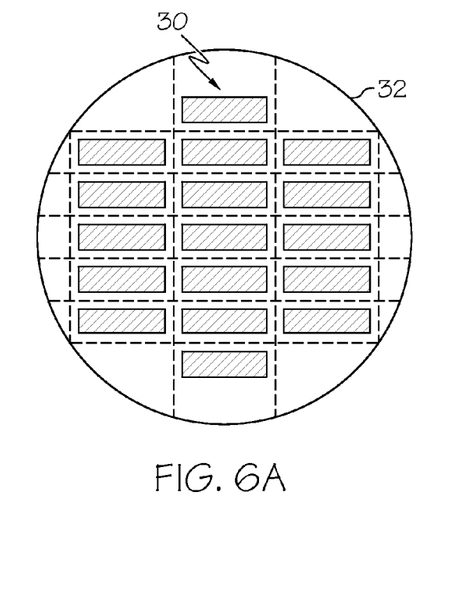
FIG. 6 depicts a method of making a fluorescent substance plus silicon according to each chip with dispensing after making the scribe line and metal pad part with blocking by using the silk screen or the metal mask in the CLCC implementation according to an embodiment of the present invention.
Figure 6B:
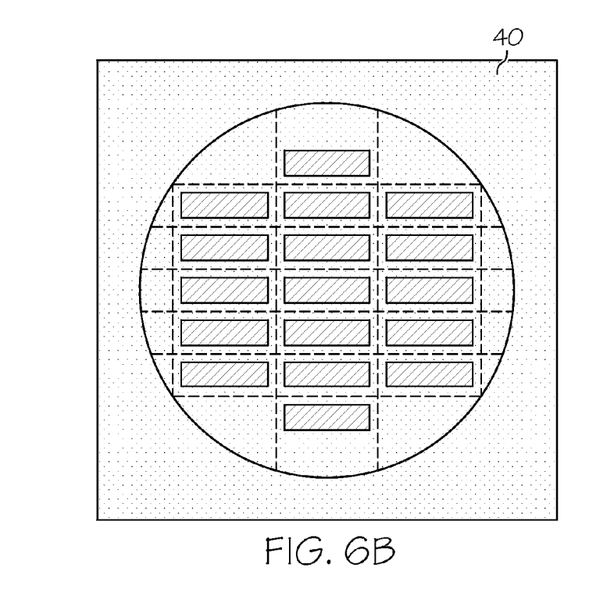
Figure 6C:
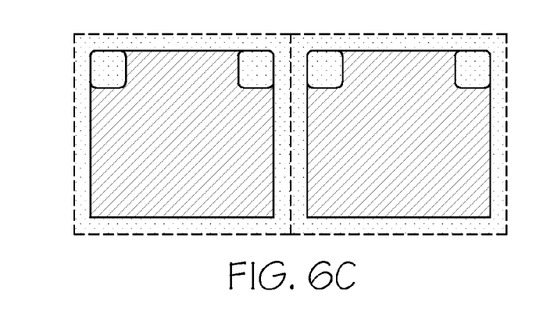

The second example is show in FIG. 6. In this embodiment, the fluorescent substance plus silicon material is able to infiltrate in dispensing through blocking the scribe line between chips 30 within wafer 32 and a metal pad part by using the silk screen or the metal mask 40, etc. After a silk screen blocking process 40, the fluorescent plus silicon material can be fit to the corresponding wavelength of each unit chip 30 with the dispensing method and the fluorescent substance plus silicon material is coated on each chip 30 in the wafer level. The configuration of this embodiment is as follows:

(1) Measure the wavelength of each comprised diode chip at the wafer level;

(2) Determine the combination ratio of the proper fluorescent substance (yellow, red, green, blue) for making the white target color output coordinate with the measured blue wavelength general classification and silicon;

(3) Block the scribe line and pad part in each chip within the wafer as shown in FIG. 6 by using the silk screen and metal mask;

(4) Coat the fluorescent substance in which it has the combination ratio appropriate for each chip wavelength within the wafer it implements, the white target color output coordinate, and the silicon material for the adhesive force with dispensing; and (5) Hard cure the fluorescent substance plus silicon material.

Figure 7A:
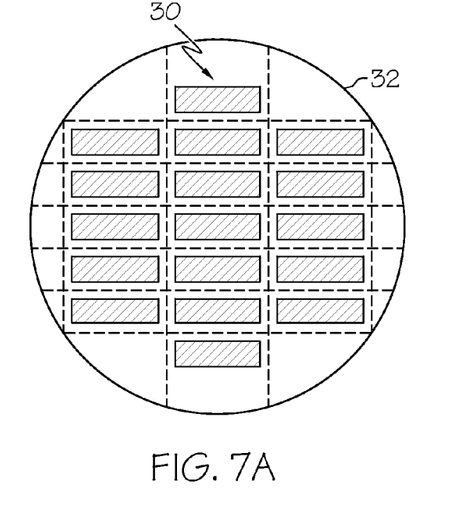
FIG. 7 depicts a method of making the fluorescent substance plus silicon according to each chip with dispensing after making the scribe line and metal pad part with masking by using the sacrificial photo resist or the organic compound in the CLCC implementation.
Figure 7B:
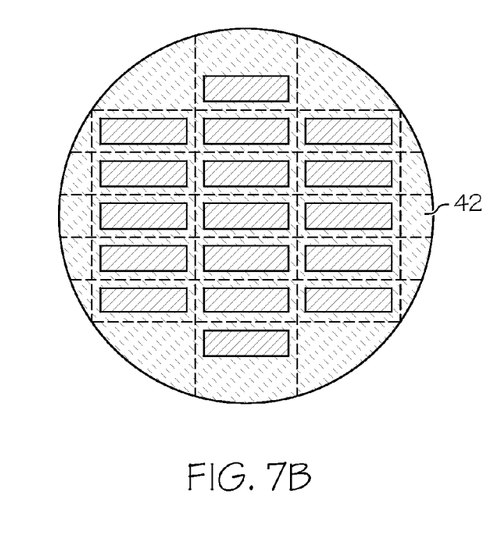
Figure 7C:
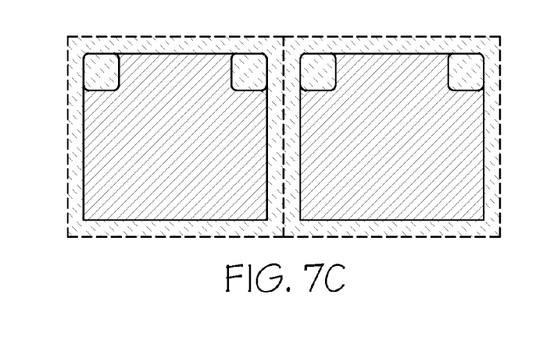

One additional technique is shown in FIG. 7. In this embodiment, the fluorescent substance plus silicon material is able to infiltrate by being dispensed between chips 30 within wafer 32 and the metal pad part by using the sacrificial layer photo resist material 42 or organic compound. Thus, after the masking process, the material fits to the corresponding wavelength of each unit chip with the dispensing method and the fluorescent substance plus silicon material is coated on the chip in the wafer level. The configuration of this embodiment is as follows.

(1) Measure the wavelength of each comprised diode chip in the wafer level;

(2) Determine the combination ratio of the proper fluorescent substance (yellow, red, green, blue, etc.) for making the white target color output coordinate with the measured blue wavelength general classification and silicon;

(3) Mask the scribe line and pad part in each chip within the wafer as shown in FIG. 7 by using the sacrificial photo resist, etc.;

(4) Coat the fluorescent substance which has the combination ratio which is appropriate for each chip wavelength within the wafer it implements, the white target color output coordinate, and the silicon material for the adhesive force with dispensing;

(5) Cure the fluorescent substance plus silicon material in the oven with the hard curing; and (6) Remove the sacrificial photo resist of the scribe line and pad part.

Thus, as described in conjunction with FIGS. 4-7, under embodiments of the present invention, the white light-emitting diode manufacturing method performs the white light-emitting diode manufacturing process in the wafer level and is different from the used chip level packaging method. In detail, in the description lower-stage wafer level, after the wavelength data of each chip is measured in advance, in order to control the fluorescent substance (red, yellow, blue, green) combination ratio appropriate for each unit chip for the corresponding wavelength accurately, and radiate the white light in the wafer level according to each chip, the fit fluorescent substance is made with dispensing. In this way, the fluorescent substance conformal coating in which it has the thickness fixed and thin in the chip surface is the basis of the possible method (chip level conformal coating: CLCC). The invention effects such as the following can be observed.

First, the white light diode processing yield is increased by the color deviation reduction between the chips, because the suitable fluorescent substance plus silicon material for the white formation is adjusted in the wafer level for each unit chip it coats.

Second, the separate sorting process is certainly not needed, since the fluorescent substance coating process is made at the discrete chip unit in the wafer level. Consequently, the total process time is shortened.

Third, the process cost and investment cost can be reduced, since it is not at the PKG level and the white color output coordinate is already obtained from the unit chip at the wafer level. The separate PKG process and material cost are not generated. Therefore, the production equipment requirements decrease in investment and white light diode chip management expenses go down, since the white light chip is manufactured at the wafer level.

In an alternative embodiment, a correspondence is easy through the COM (chip on module) in which we use the flip chip mode and the COB (chip on board), since the white light diode chip is completed for each chip at the wafer level. As a result, since existing processes, including the separate die attachment, wiring, the fluorescent substance coating, etc., can be skipped, the process cost, the material cost, etc., can be reduced.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method of manufacturing a 3-dimensional display, comprising:

taking a measurement of at least one chip disposed within a wafer;

isolating the at least one chip disposed within the wafer using at least one of the following: paraffin wax, a silk screen, or a photo resist;

applying a fluorescent substance coating to the at least one chip disposed within the wafer to form at least one coated chip, the fluorescent substance coating having a phosphor ratio that is based on the measurement for each of the at least one chip disposed within the wafer, wherein the fluorescent substance coating converts a light output of the chip to white light;

forming at least one light emitting pixel from the at least one coated chip; and arranging a plurality of the at least one light-emitting pixel within a display generating the 3-dimensional display using the active light control circuitry and plurality of the at least one light-emitting pixel, the active light control circuitry controlling light emitted from the plurality of the at least one light-emitting pixel to generate the 3-dimensional display.

2. The method of claim 1, the plurality of at least one light-emitting pixel comprising a plurality of LED light-emitting pixels.

3. The method of claim 2, comprising stacking the plurality of at least one light-emitting pixels in successive fashion within the 3-dimensional display.

4. The method of claim 3, the stacking comprising maintaining a predetermined distance between each of the at least one light-emitting pixels.

5. The method of claim 1, the plurality of at least one light-emitting pixel comprising LED-based pixels.

6. The method of claim 5, wherein the white light that is derived from the fluorescent substance having a combination of red, green, and blue colors.

7. The method of claim 1, the plurality of at least one light-emitting pixel comprising at least one LCD-based light-emitting pixel.

8. The method of claim 1, the plurality of at least one light-emitting pixel comprising OLED-based light-emitting pixels.

9. The method of claim 1, the active light control circuitry being configured to control an intensity of the light emitted from the plurality of at least one light-emitting pixel.

10. A method of manufacturing a 3-dimensional display, comprising:
providing at least one light-emitting pixel comprising at least one of: LED, LCD and OLED, the at least one light-emitting pixel disposed within a wafer;
taking a measurement of the at least one light-emitting pixel;
isolating the at least one light-emitting pixel using at least one of the following: paraffin wax, a silk screen, or a photo resist;
applying a fluorescent substance coating to the at least one light-emitting pixel to produce at least one coated light-emitting pixel, the fluorescent substance coating having a phosphor ratio that is based on the measurement for each of the at least one light-emitting pixel disposed within the wafer, wherein the fluorescent substance coating converts a light output of the light emitting pixel to white light;
arranging a plurality of the at least one coated light-emitting pixel in successive fashion within a plane,
stacking a plurality of arranged plurality of the at least one coated light-emitting pixel in successive fashion within a display; and
generating the 3-dimensional display using the active light control circuitry and plurality of arranged plurality of the at least one coated light-emitting pixel, the active light control circuitry being configured to control an intensity of light emitted from the plurality of arranged plurality of the at least one coated light-emitting pixel.

11. The method of claim 10, the stacking comprising maintaining a predetermined distance between each of the plurality of the at least one coated light-emitting pixel.

12. A 3-dimensional display, comprising:
a plurality of light-emitting pixels arranged in successive fashion within a plane, the plurality of light-emitting pixels being selected from a group consisting of LCD-based light-emitting pixels, LED-based light-emitting pixels, OLED-based light-emitting pixels, or a combination thereof,
a plurality of arranged plurality of light-emitting pixels—stacked in successive fashion within a display;
active light control circuitry being configured to control an intensity of light emitted from the plurality of light-emitting pixels; and
a 3-dimensional display generated using the plurality of arranged plurality of light-emitting pixels and the active light control circuitry;
wherein at least one of the plurality of light-emitting pixels are manufactured by a process comprising:
taking a measurement of at least one chip disposed within a wafer;
isolating the at least one chip disposed within the wafer using at least one of the following: paraffin wax, a silk screen, or a photo resist;
applying a fluorescent substance coating to the at least one chip disposed within the wafer to form at least one coated chip, the fluorescent substance coating having a phosphor ratio that is based on the measurement for each of the at least one chip disposed within the wafer, wherein the fluorescent substance coating converts a light output of the chip to white light; and
forming at least one of the plurality of light emitting pixels from the at least one coated chip.

13. The 3-dimensional display of claim 12, each of the arranged plurality of light-emitting pixels being stacked with a predetermined distance there between.

14. The 3-dimensional display of claim 12, further comprising active light control circuitry configured to control the plurality of arranged plurality of light-emitting pixels.

15. The 3-dimensional display of claim 12, the 3-dimensional view being viewable to the naked eye of a viewer.

* * * * *